US011849273B2

(12) United States Patent
Cheng et al.

(10) Patent No.: US 11,849,273 B2
(45) Date of Patent: Dec. 19, 2023

(54) BLUETOOTH GLASSES

(71) Applicants: Hsi-Chou Cheng, Tainan (TW); Shue-Yu Huang, Taipei (TW)

(72) Inventors: Hsi-Chou Cheng, Tainan (TW); Shue-Yu Huang, Taipei (TW)

(*) Notice: Subject to any disclaimer, the term of this patent is extended or adjusted under 35 U.S.C. 154(b) by 0 days.

(21) Appl. No.: 17/674,183

(22) Filed: Feb. 17, 2022

(65) Prior Publication Data
US 2023/0040338 A1 Feb. 9, 2023

(30) Foreign Application Priority Data

Aug. 9, 2021 (TW) .................. 110129331

(51) Int. Cl.
H04R 1/10 (2006.01)
(52) U.S. Cl.
CPC ........... *H04R 1/105* (2013.01); *H04R 1/1025* (2013.01); *H04R 2420/07* (2013.01)
(58) Field of Classification Search
None
See application file for complete search history.

(56) References Cited

U.S. PATENT DOCUMENTS

2022/0128815 A1* 4/2022 Lee ..................... G02B 27/288

FOREIGN PATENT DOCUMENTS

CN 215895141 U * 2/2022

* cited by examiner

*Primary Examiner* — Kenny H Truong
(74) *Attorney, Agent, or Firm* — Rosenberg, Klein & Lee

(57) ABSTRACT

A pair of Bluetooth glasses is revealed. The Bluetooth glasses includes a glasses body with a first assembly portion disposed on a rear end of a temple thereof, a Bluetooth earphone having a second assembly portion arranged at a front end of an earphone body thereof, and a connection member. The second assembly portion is mounted into one end of a sleeve of the connection member while the first assembly portion on the temple is mounted into the other end of the sleeve. Thereby the temple is assembled with the Bluetooth earphone conveniently and various combinations of materials such as metals and plastic are used to increase Bluetooth glasses styles. Moreover, an adjustment knob is mounted to the earphone body of the Bluetooth earphone for switching between a front broadcast hole and a rear broadcast hole through which sounds from a speaker are output.

10 Claims, 17 Drawing Sheets

BLUETOOTH GLASSES

BACKGROUND OF THE INVENTION

Field of the Invention

The present invention relates to glasses, especially to glasses with a pair of Bluetooth earphone. The word "Bluetooth" used throughout the specification is a Registered Trade Mark.

Description of Related Art

Bluetooth glasses available now mainly includes a circuit module which is provided with a Bluetooth communication component, a speaker, etc. and mounted in a temple of the glasses. During production process, the circuit module is set in a mold before plastic injection of the temple and then the temple is formed by plastic injection. Thus the Bluetooth glasses available now are only used in combination with plastic temples, unable to be applied to metal temples. Therefore, the style is monotonous and users don't have too much options to select the styles they like. Both popularity and competitiveness of the Bluetooth glasses available now are affected.

SUMMARY OF THE INVENTION

Therefore, it is a primary objet of the present invention to provide a pair of Bluetooth glasses in which a Bluetooth earphone and temples of glasses made of different materials are assembled with each other conveniently and positions through which sounds are output can be adjusted according to users' needs.

In order to achieve the above objects, a pair of Bluetooth glasses includes a glasses body, a Bluetooth earphone, and a connection member. A first assembly portion is disposed on a rear end of a temple of the glasses body and a second assembly portion is arranged at a front end of an earphone body of the Bluetooth earphone. The second assembly portion is aligned with and mounted into one end of a sleeve of the connection member while the first assembly portion on the temple is aligned with and mounted into the other end of the sleeve. Thereby the Bluetooth earphone is assembled with the temple of the glasses body conveniently and various combinations of materials such as metals and plastic are provided to increase styles of the Bluetooth glasses. Moreover, an adjustment knob is mounted to the earphone body of the Bluetooth earphone. While rotating the adjustment knob, sounds from a speaker of the Bluetooth earphone are switched to be output through a front broadcast hole or a rear broadcast hole. Thereby the Bluetooth glasses are more convenient to use.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
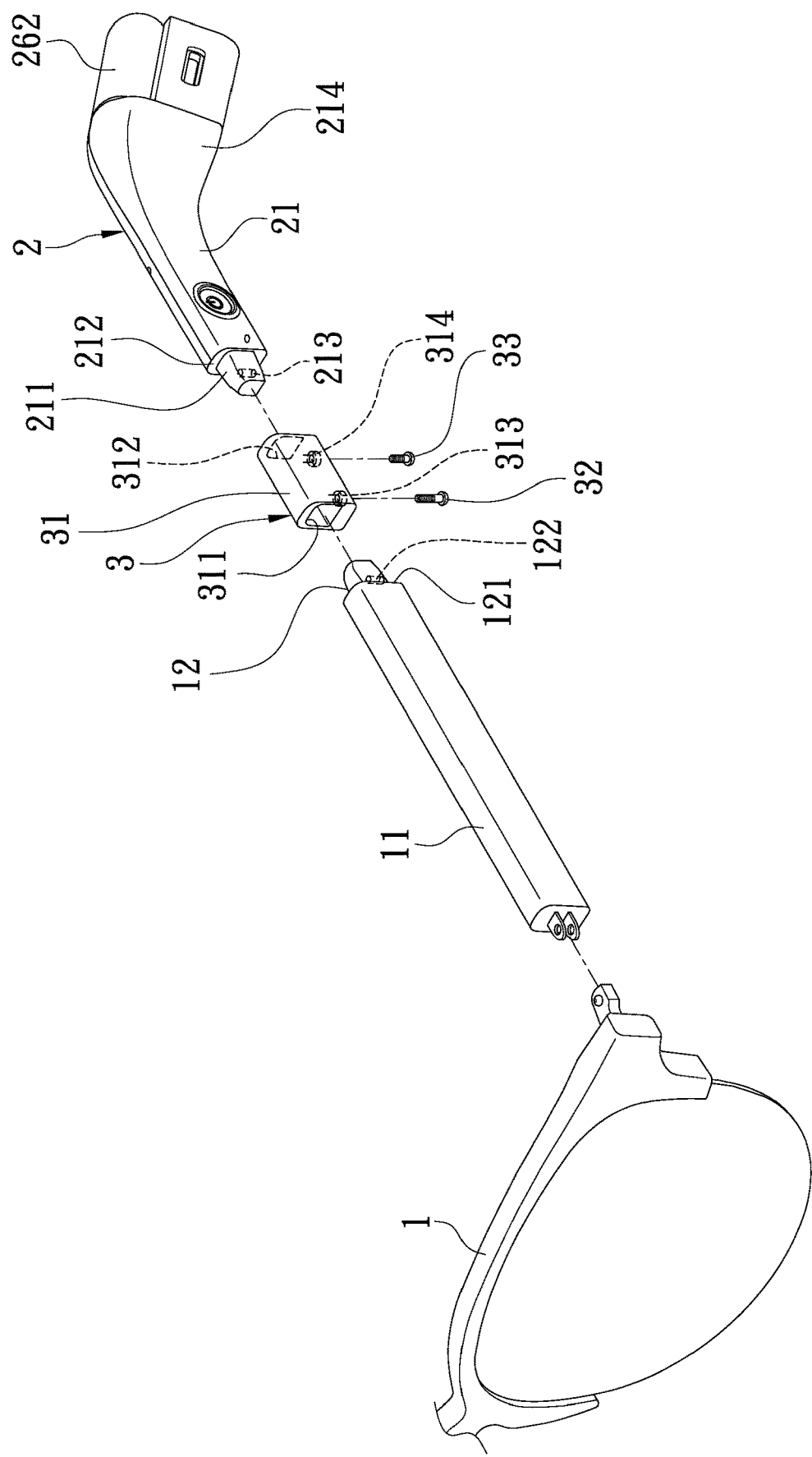
FIG. 1 is an exploded view of a first embodiment according to the present invention.

Refer to FIG. 1, a pair of Bluetooth glasses according to the present invention includes a glasses body 1, a Bluetooth earphone 2, and a connection member 3. The glasses body 1 consists of a temple 11 pivotally connected to a lateral side of the glasses body 1 and a first assembly portion 12 connected to a rear end of the temple 11. The first assembly portion 12 is a rectangular block and composed of a first stopping edge 121 formed on connection area between the temple 11 and the first assembly portion 12 and a first lock hole 122 arranged at a bottom side thereof. The temple 11 is made of metal or plastic.

Figure 2:
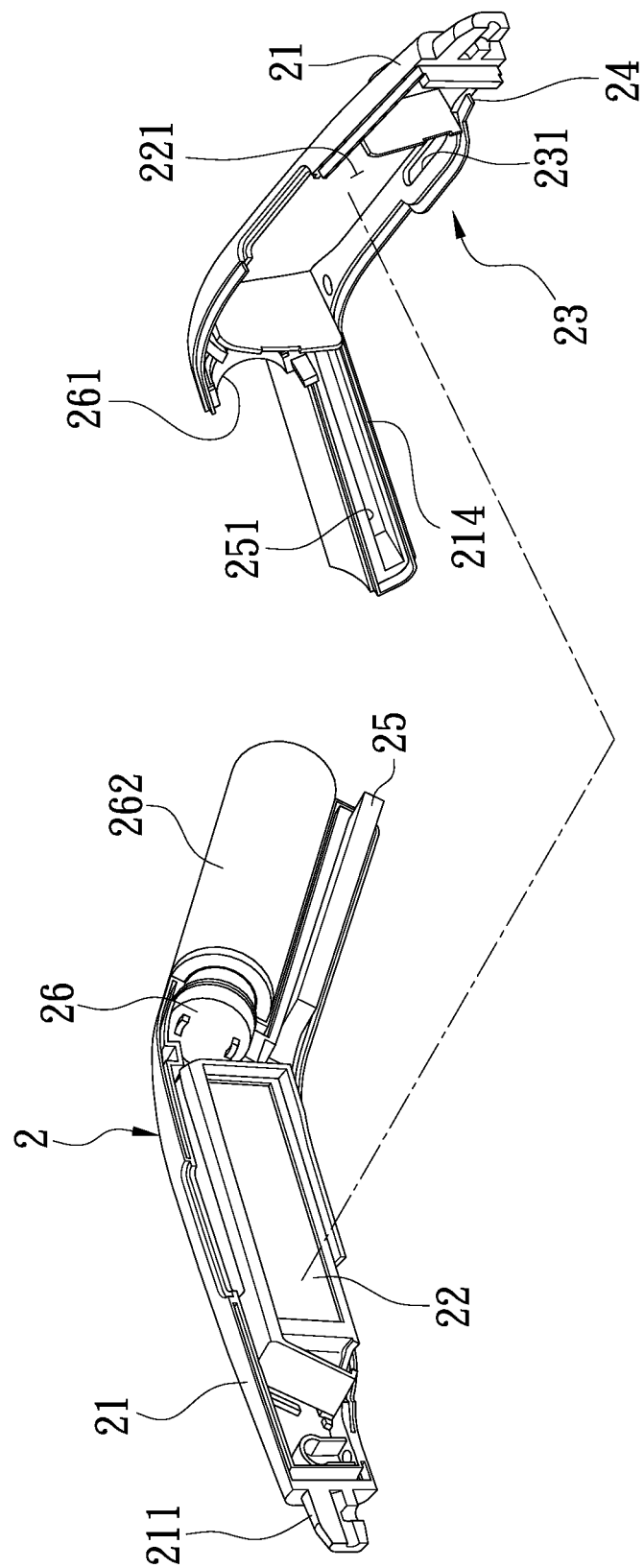
FIG. 2 is an exploded view of a Bluetooth earphone of a first embodiment according to the present invention.
Figure 3:
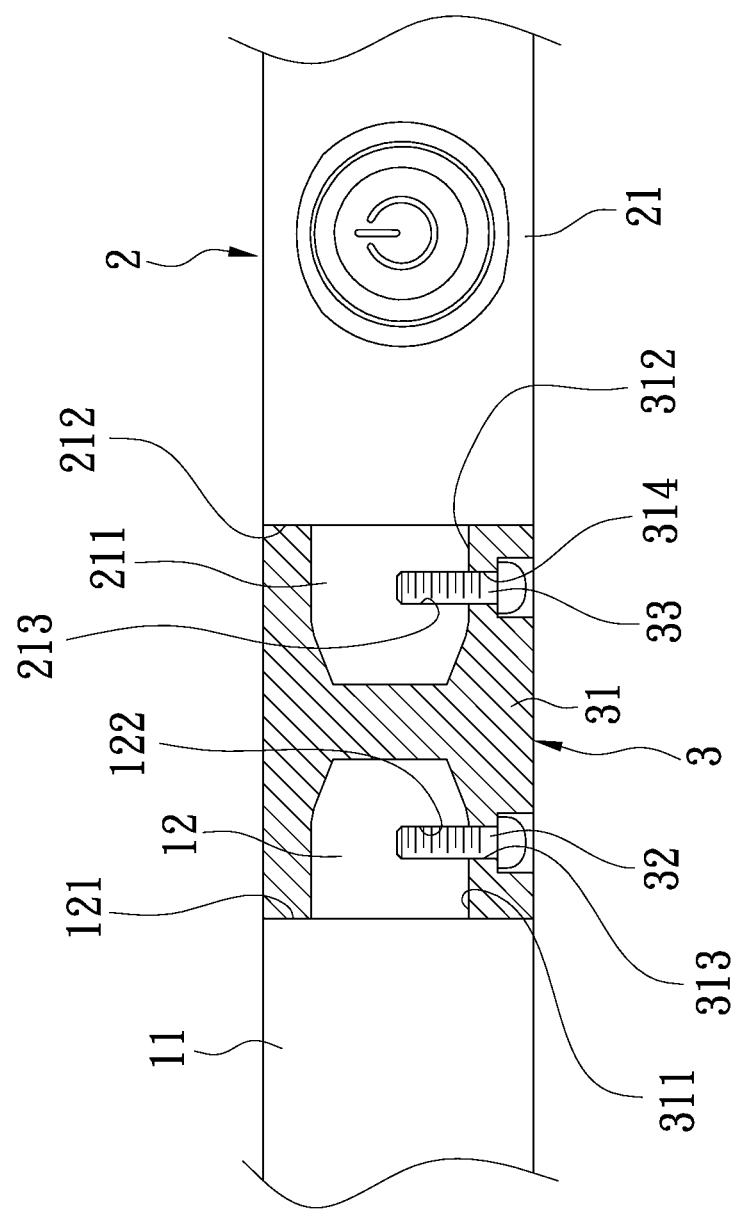
FIG. 3 is a partial sectional view of a connection member of a first embodiment according to the present invention.

Refer to FIG. 1, FIG. 2 and FIG. 3, the Bluetooth earphone 2 is composed of an earphone body 21, a speaker 22, at least one broadcast hole 23, a microphone hole 24, a circuit module 25, and a power connector 26. The earphone body 21 consist of a second assembly portion 211 which is a rectangular block and connected to a front end of the earphone body 21, a second stopping edge 212 formed on connection area between the earphone body 21 and the second assembly portion 211, a second lock hole 213 arranged at a bottom side of the second assembly portion 211, and an ear-hanging part 214 curved downward and disposed on a rear part of the earphone body 21. A speaker cavity 221 is formed in a front part of the earphone body 21 and the speaker 22 is mounted in the speaker cavity 221 while a front broadcast hole 231 of the broadcast hole 23 is formed on a bottom side of the front part of the earphone body 21 and the microphone hole 24 is also arranged at the bottom side of the front part of the earphone body 21 in front of the front broadcast hole 231. A circuit-module cavity 251 is disposed in the ear-hanging part 214 at the rear part of the earphone body 21 and the circuit module 25 provided with a Bluetooth communication component is mounted in the circuit-module cavity 251 while an assembly hole 261 is arranged at the rear part of the earphone body 21 over the circuit-module cavity 251 and the power connector 26 is mounted in the assembly hole 261. Both the speaker 22 and the power connector 26 are electrically connected to the circuit module 25 so that sounds are played from the speaker 22 and received through the microphone hole 24 of the earphone body 21 under control of the circuit module 25. The Bluetooth earphone 2 is further provided with a rechargeable battery 262 which is assembled with the power connector 26.

Refer to FIG. 1 and FIG. 3, the connection member 3 includes a sleeve 31, a first fastener 32, and a second fastener 33. The sleeve 31 is a rectangular prism made of metal or plastic and provided with a first mounting hole 311 extending backward from a front end of the sleeve 31, a second mounting hole 312 extending forward from a rear end of the sleeve 31, a first insertion hole 313, and a second insertion hole 314. Both the first and the second mounting holes 311, 312 are rectangular with the same size (diameter). The first insertion hole 313 and the second insertion hole 314 which are arranged at a bottom side of the sleeve 31 are communicating with the first mounting hole 311 and the second mounting hole 312 respectively. The first assembly portion 12 which is a rectangular block of the temple 11 is aligned with and mounted into the rectangular first mounting hole 311 of the sleeve 31 and the first stopping edge 121 of the first assembly portion 12 is abutting against and positioned by the front end of the sleeve 31. The first lock hole 122 of the first assembly portion 12 is aligned with the first insertion hole 313 of the sleeve 31 and the first fastener 32 is inserted through the first insertion hole 313 of the sleeve 31 to be connected and fixed with the first lock hole 122 of the first assembly portion 12. The second assembly portion 211 which is a rectangular block of the earphone body 21 of the Bluetooth earphone 2 is aligned with and mounted into the rectangular second mounting hole 312 of the sleeve 31 and the second stopping edge 212 of the second assembly portion 211 is abutting against and positioned by the rear end of the sleeve 31. The second lock hole 213 of the second assembly portion 211 is aligned with the second insertion hole 314 of the sleeve 31 and the second fastener 33 is inserted through the second insertion hole 314 of the sleeve 31 to be connected and fixed with the second lock hole 213 of the second assembly portion 211.

Figure 4:
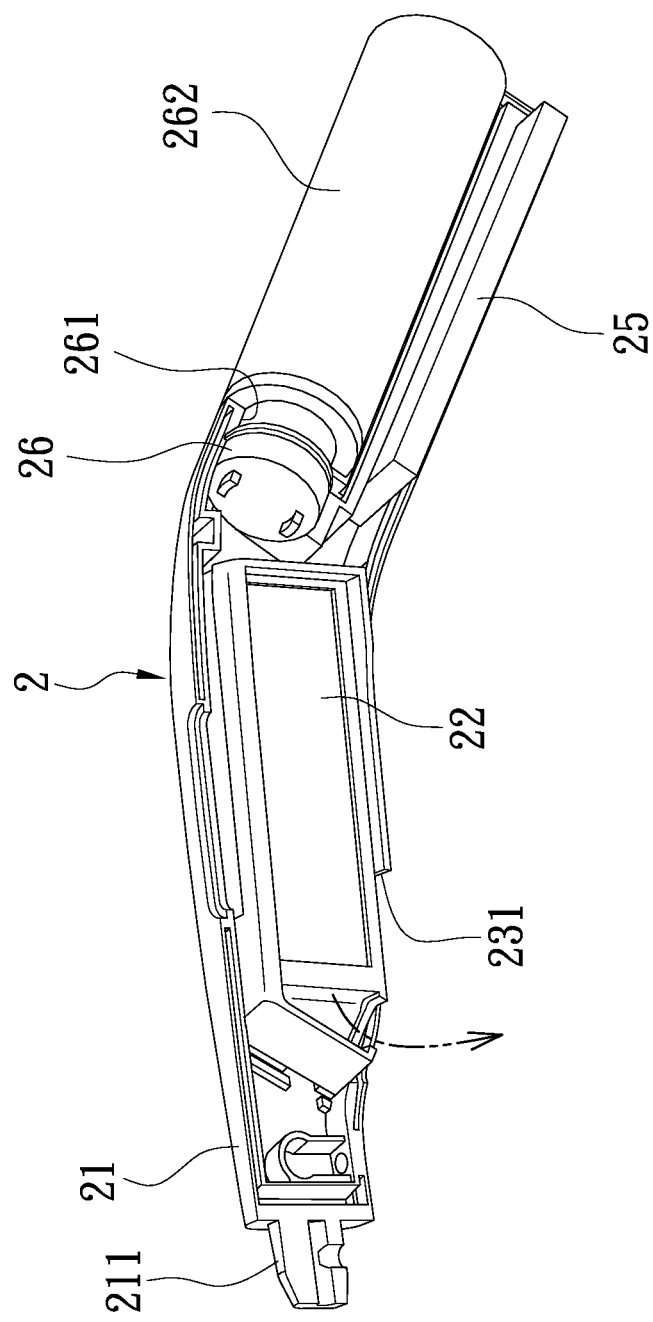
FIG. 4 is a schematic drawing showing sound transmission of a Bluetooth earphone of a first embodiment according to the present invention.

Thereby users can wear the present Bluetooth glasses and drive the circuit module 25 of the Bluetooth earphone 2 to connect with a mobile device by the Bluetooth communication component and control the speaker 22 to play audio signals. As shown in FIG. 4, users can hear sounds or music played by the speaker 22 through the front broadcast hole 231 communicating with the speaker cavity 221 while wearing the glasses.

Figure 5:
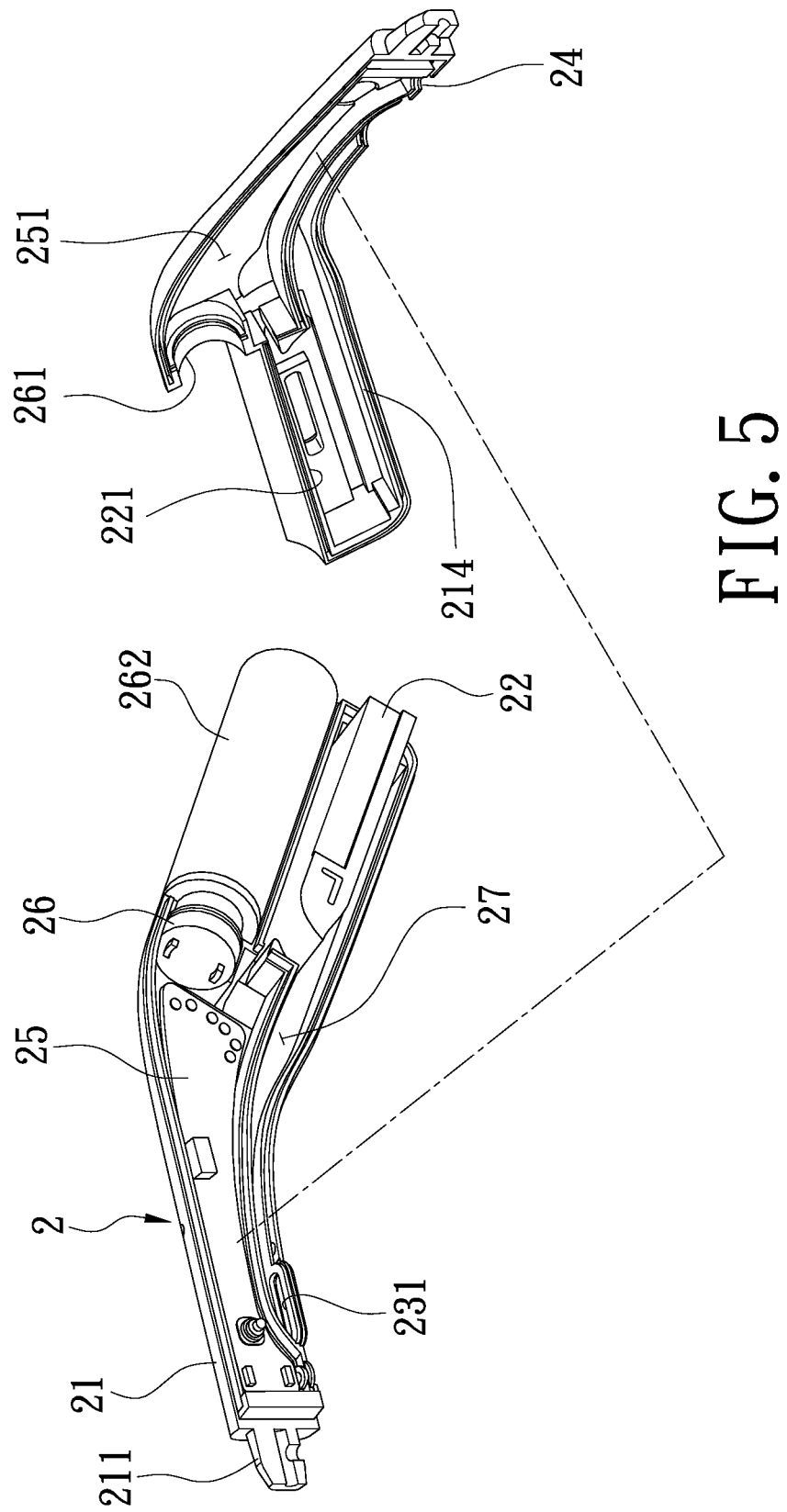
FIG. 5 is an exploded view of a Bluetooth earphone of a second embodiment according to the present invention.
Figure 6:
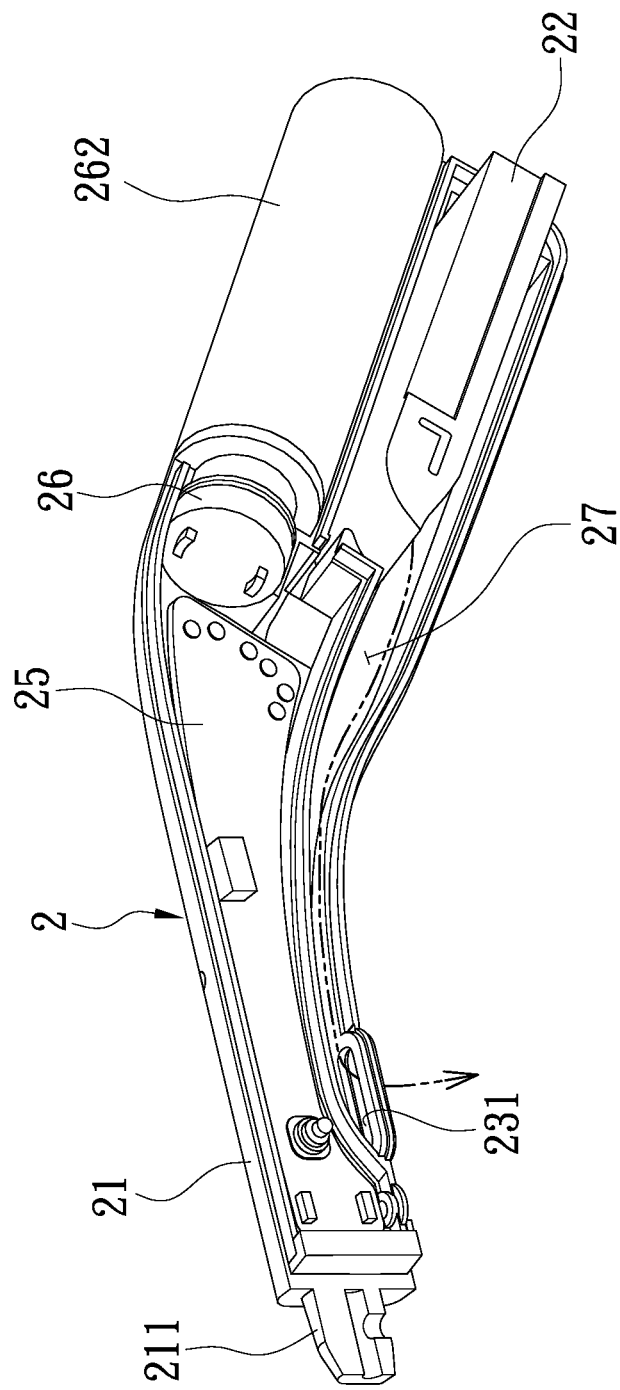
FIG. 6 is a schematic drawing showing a sound transmission path of a Bluetooth earphone of a second embodiment according to the present invention.

Refer to FIG. 5, another embodiment is disclosed. In this embodiment, the speaker cavity 221 and the circuit-module cavity 251 of the Bluetooth earphone 2 are interchanged so that the circuit-module cavity 251 is located at the front part of the earphone body 21 and the speaker cavity 221 is located at the rear part of the earphone body 21. The earphone body 21 is further provided with an audio guide channel 27 therein by which the front broadcast hole 231 on the front part of the earphone body 21 is communicating with the speaker cavity 221 on the rear part of the earphone body 21. Also refer to FIG. 6, sounds from the speaker 22 in the speaker cavity 221 at the rear part of the earphone body 21 are played through the front broadcast hole 231 through the audio guide channel 27.

Figure 7:
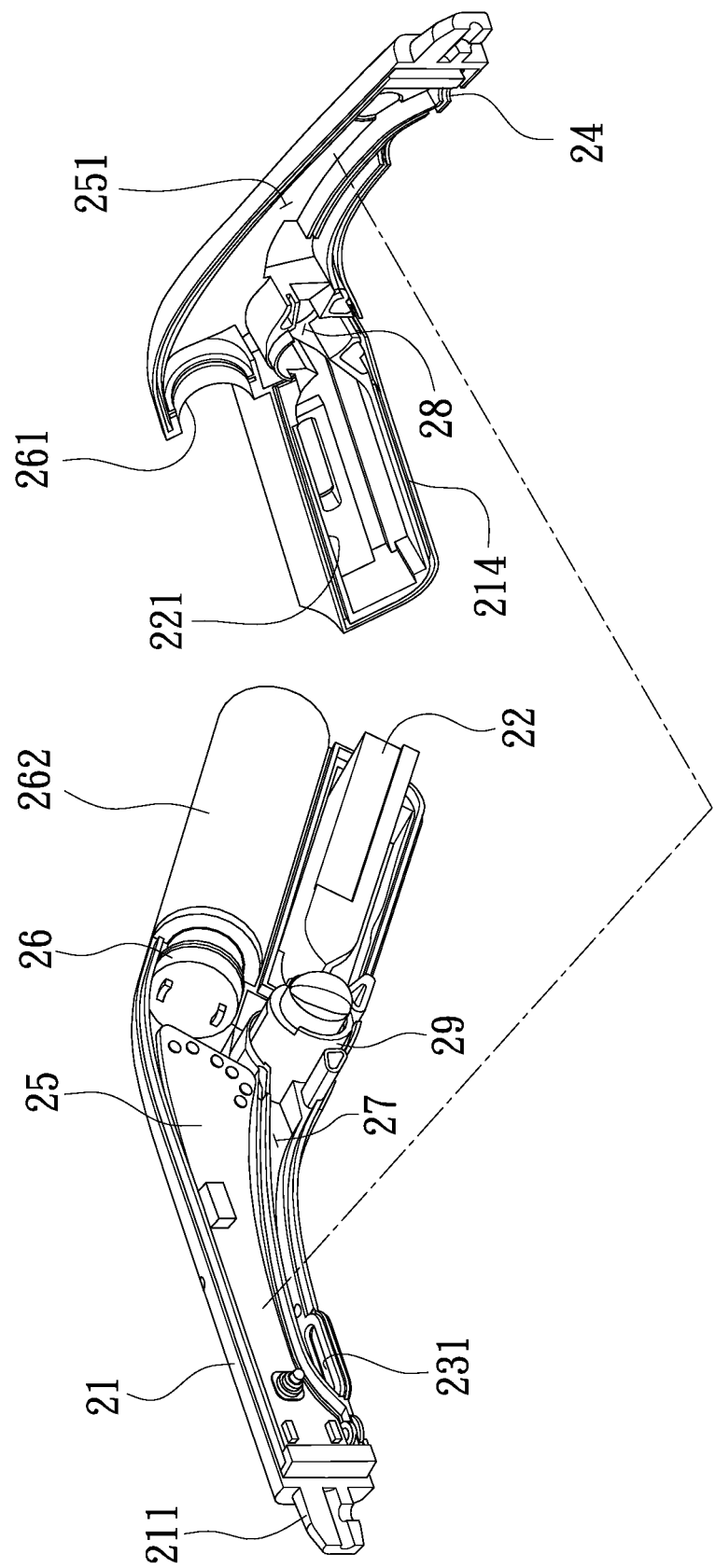
FIG. 7 is an exploded view of a Bluetooth earphone of a third embodiment according to the present invention.
Figure 8:
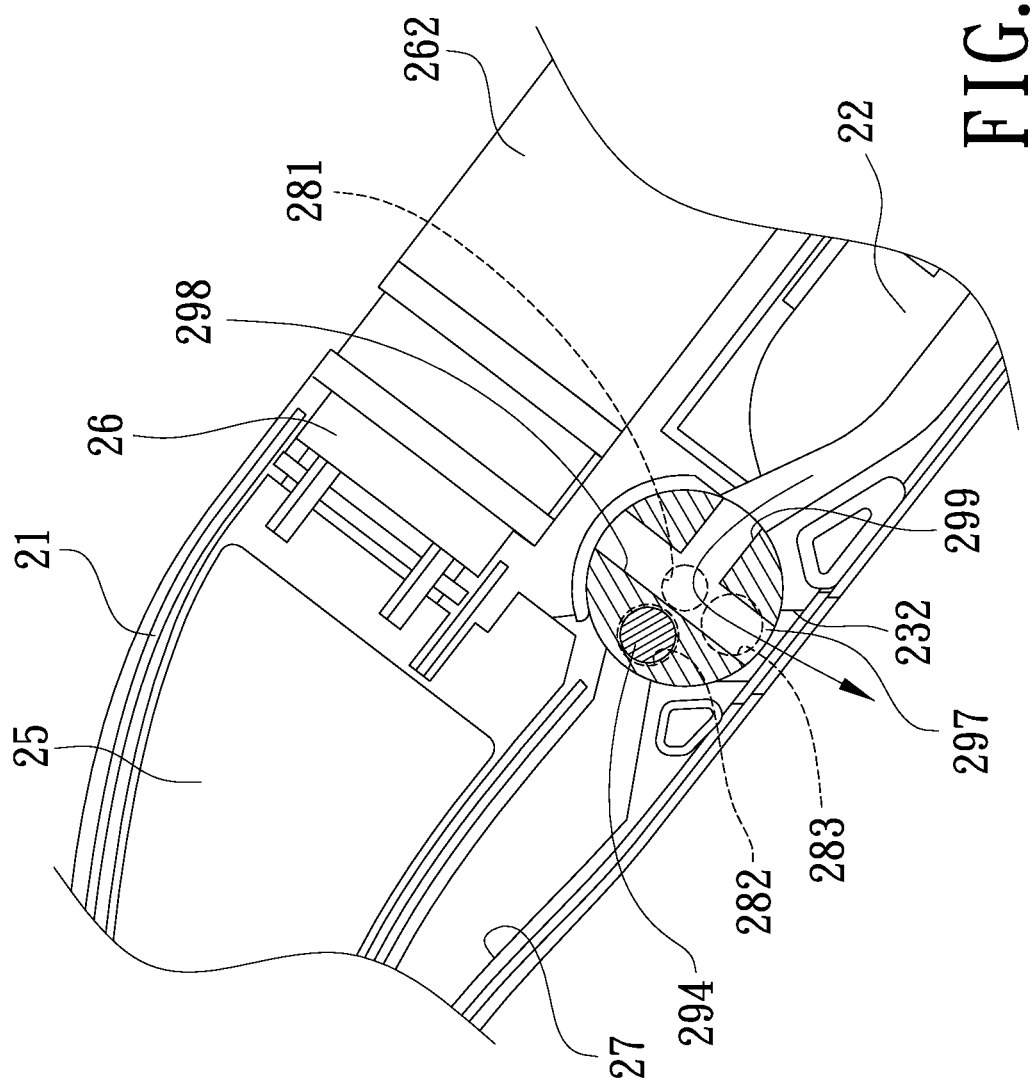
FIG. 8 is a partial enlarged sectional view of a Bluetooth earphone of a third embodiment according to the present invention.
Figure 9:
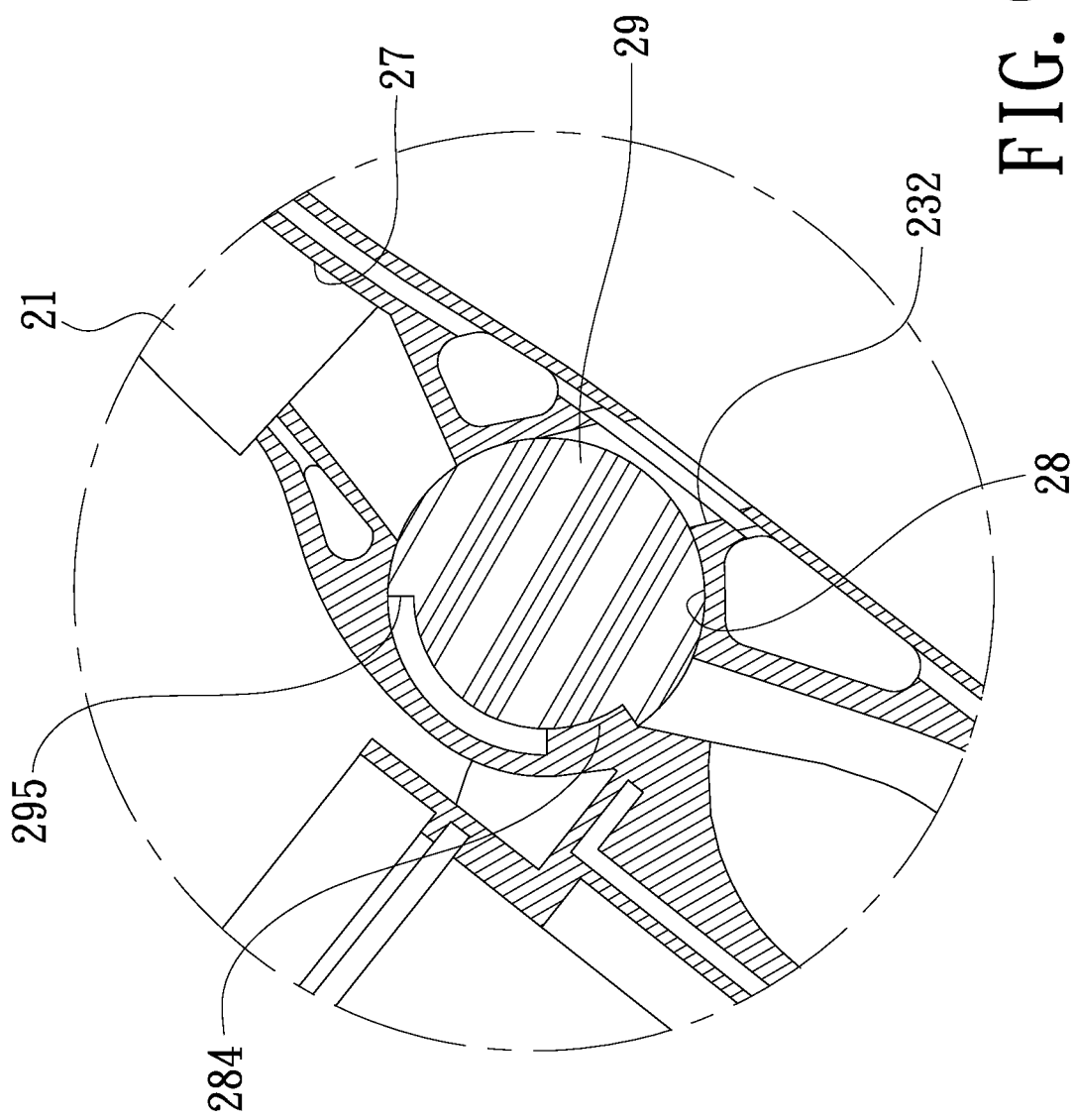
FIG. 9 is another partial enlarged sectional view of a Bluetooth earphone of a third embodiment according to the present invention.
Figure 10:
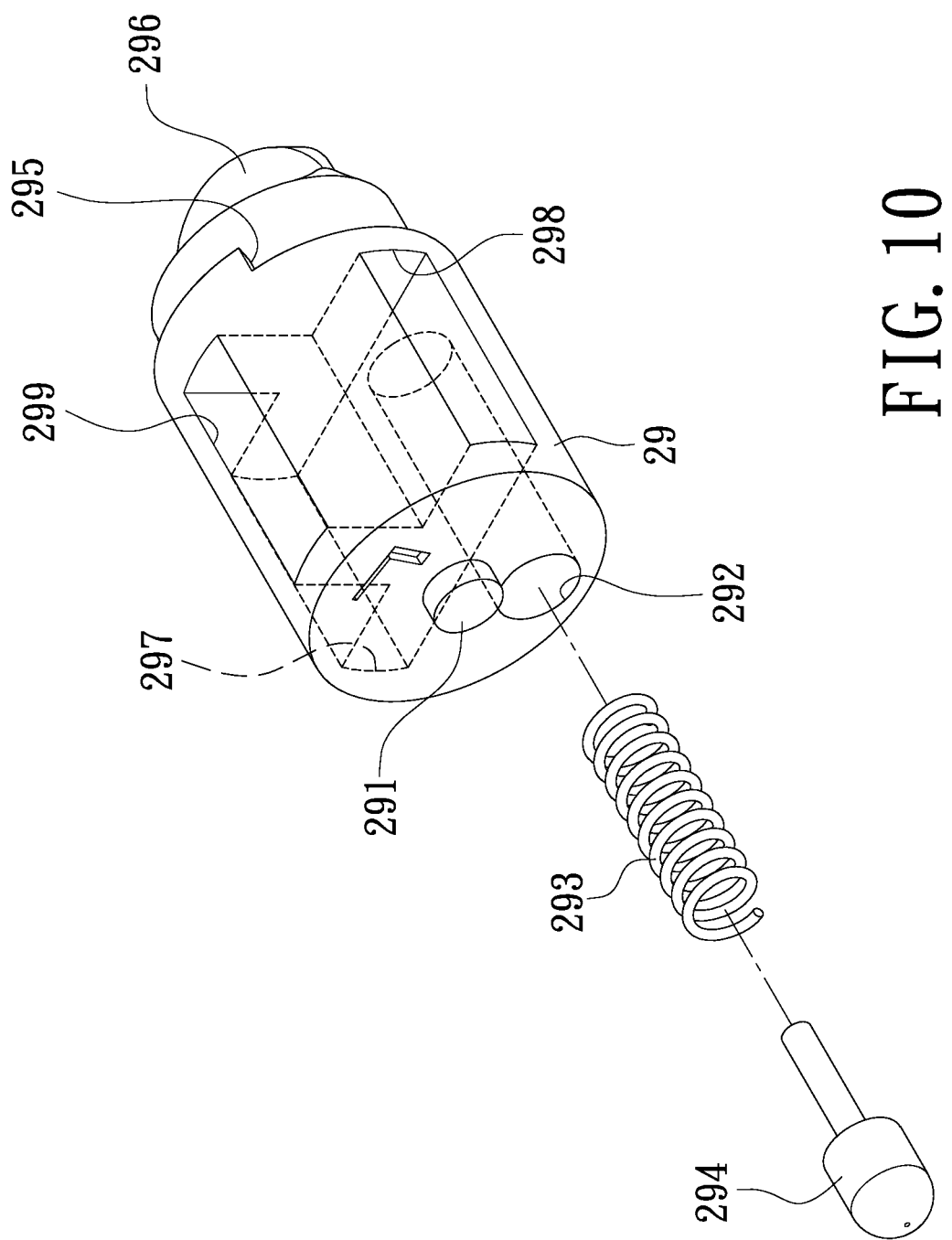
FIG. 10 is a partial exploded view of a Bluetooth earphone of a third embodiment according to the present invention.

Also refer to FIG. 7, a further embodiment is revealed. The circuit-module cavity 251 is formed in the front part of the earphone body 21 of the Bluetooth earphone 2 while the speaker cavity 221 is mounted in the rear part of the earphone body 21. The earphone body 21 is further provided with a knob cavity 28 located between the speaker cavity 221 and the circuit-module cavity 251. With reference to FIG. 8, an axial hole 281 is mounted to a middle part of a bottom of the knob cavity 28 while a first positioning hole 282 and a second positioning hole 283 with a certain interval therebetween are also arranged at the bottom of the knob cavity 28 and located around the axial hole 281. A limit projection 284 is disposed on a wall of the knob cavity 28, as shown in FIG. 9. A front broadcast hole 231 is arranged at the bottom side of the front part of the earphone body 21 and an audio guide channel 27 is mounted in the earphone body 21 for communicating the knob cavity 28 with the front broadcast hole 231. A rear broadcast hole 232 of the broadcast hole 23 is mounted to the bottom side of the earphone body 21 at the position corresponding to the knob cavity 28 for communicating with the knob cavity 28. Refer to FIG. 10, an adjustment knob 29 is mounted in the knob cavity 28 and provided with a rotating pin 291 arranged at a middle part of an inner surface thereof and assembled with the axial hole 281 of the knob cavity 28, a receiving hole 292 located at the inner surface thereof and beside the rotating pin 291, an elastic member 293 and a positioning member 294 mounted into the receiving hole 292 in turn, a limit slot 295 mounted to a wall thereof (also shown in FIG. 9) and having a first side and a second side opposite to each other, and a knob part 296 formed on an outer surface thereof and exposed outside the knob cavity 28. The positioning member 294 can be either locked with and positioned by the first positioning hole 282 or the second positioning hole 283 of the knob cavity 28 selectively. The limit projection 284 of the knob cavity 28 is mounted in the limit slot 295 of the adjustment knob 29 to be abutting against and limited by the first side or second side of the limit slot 295 selectively. A first sound channel 297, a second sound channel 298, and a third sound channel 299 are disposed on the wall of the adjustment knob 29 with an interval between the two adjacent channels. The first sound channel 297 and the second sound channel 298 are disposed on two opposite sides of the adjustment knob 29 while the third sound channel 299 is located between and communicating with the first sound channel 297 and the second sound channel 298 to form a T-shaped sound channel. The positions of the first sound channel 297, the second sound channel 298, and the third sound channel 299 can be moved and switched to be aligned with the positions of the speaker 22, the audio guide channel 27, and the rear broadcast hole 232 correspondingly and selectively.

Figure 11:
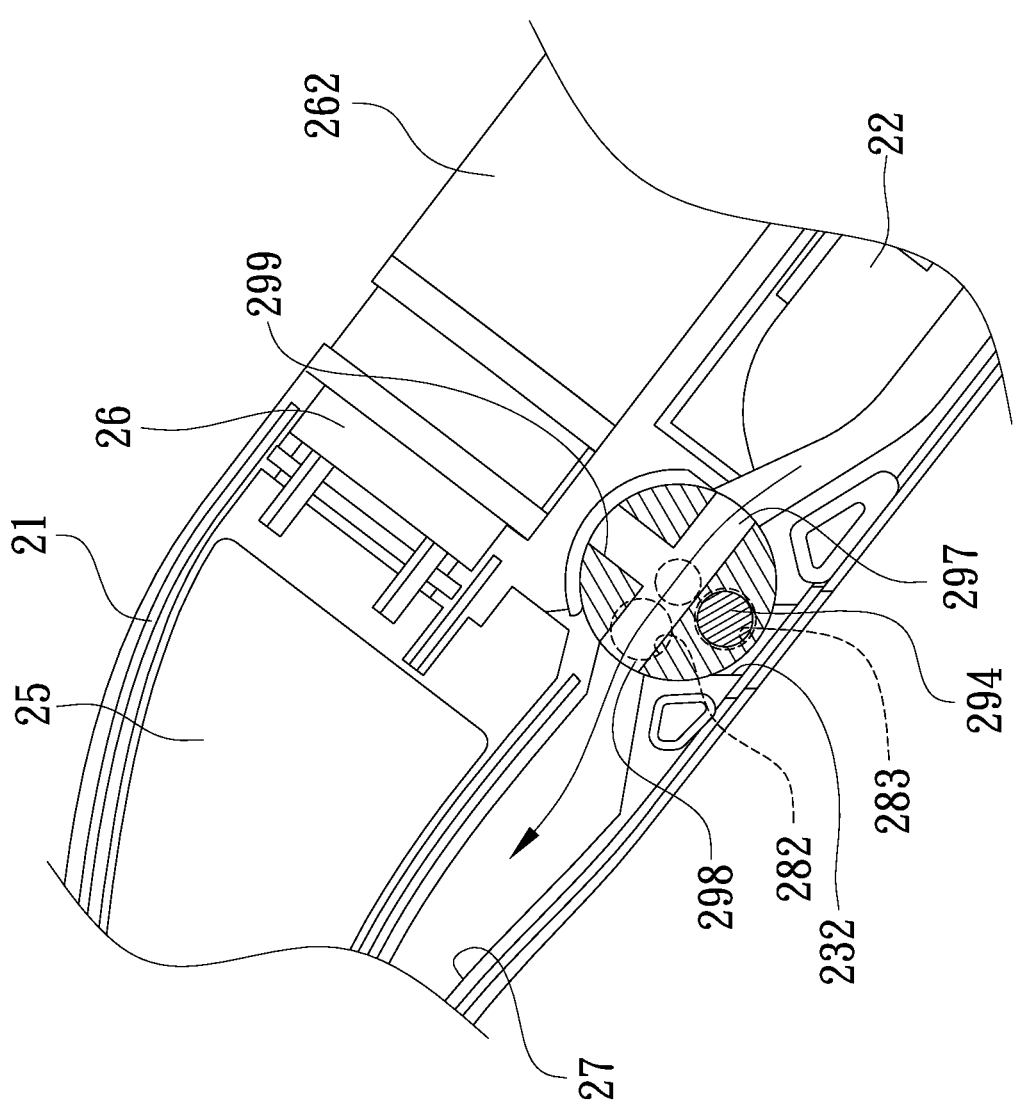
FIG. 11 is a partial enlarged view showing a sound transmission path of a Bluetooth earphone of a third embodiment according to the present invention.

As shown in FIG. 8, while the adjustment knob 29 is rotated to the first positioning hole 282 of the knob cavity 28 by operating the knob part 296, the elastic member 293 in the receiving hole 292 of the adjustment knob 29 abuts against and pushes the positioning member 294 outward to lock and position by the first positioning hole 282. The limit projection 284 of the knob cavity 28 is also abutting against the first side of the limit slot 295 for limiting. Now the third sound channel 299 is aligned with the speaker 22 in the speaker cavity 221 and the first sound channel 297 is aligned with the rear broadcast hole 232 while the second sound channel 298 is blocked by the wall of the knob cavity 28. Thus the sounds played by the speaker 22 are transmitted through the third sound channel 299 and the first sound channel 297 in turn to be output through the rear broadcast hole 232. Moreover, refer to FIG. 11, when the adjustment knob 29 is rotated to another position where the positioning member 294 is locked in the second positioning hole 283, the limit projection 284 of the knob cavity 28 is abutting against the second side of the limit slot 295 of the adjustment knob 29. Now the third sound channel 299 is blocked by the wall of the knob cavity 28 while the first sound channel 297 is aligned with the speaker 22 and the second sound channel 298 is aligned with the audio guide channel 27. Thus sounds from the speaker 22 are transmitted through the first sound channel 297, the second sound channel 298, and the audio guide channel 27 in turn to be played through the front broadcast hole 231.

Figure 12:
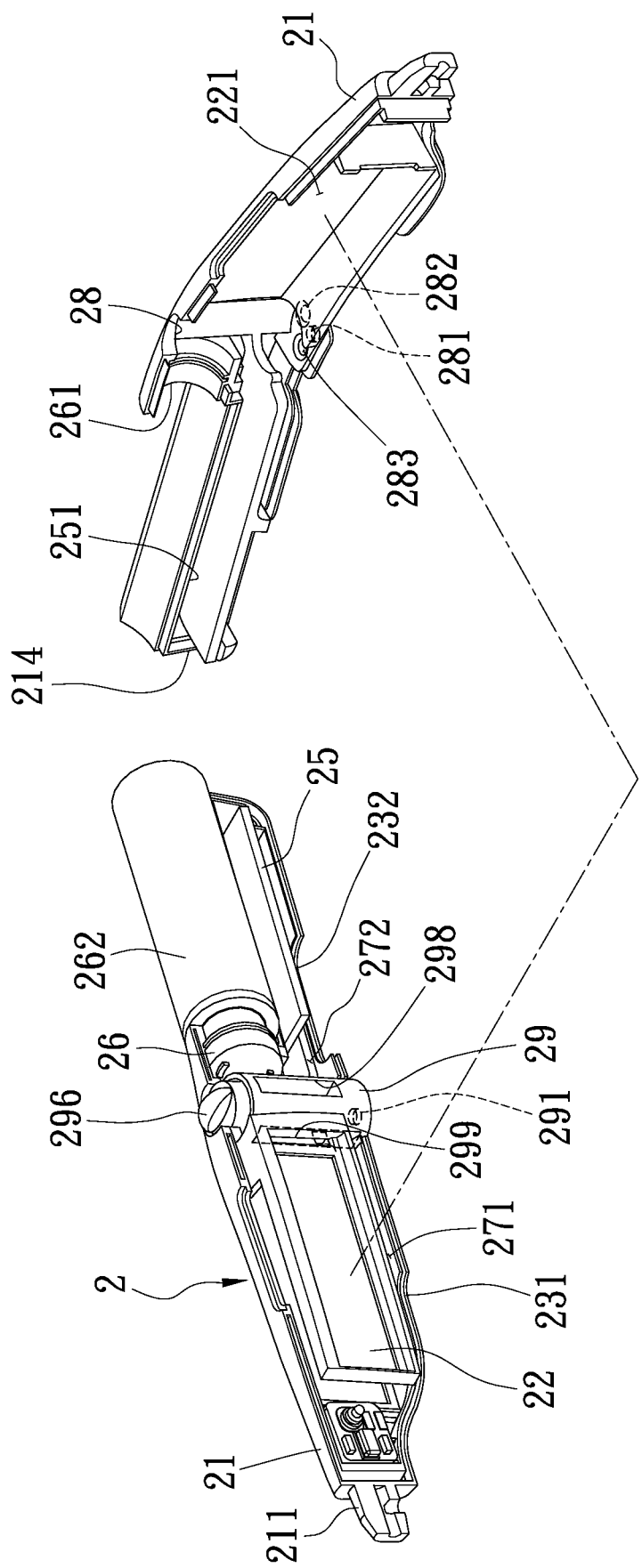
FIG. 12 is an exploded view of a Bluetooth earphone of a fourth embodiment according to the present invention.
Figure 13:
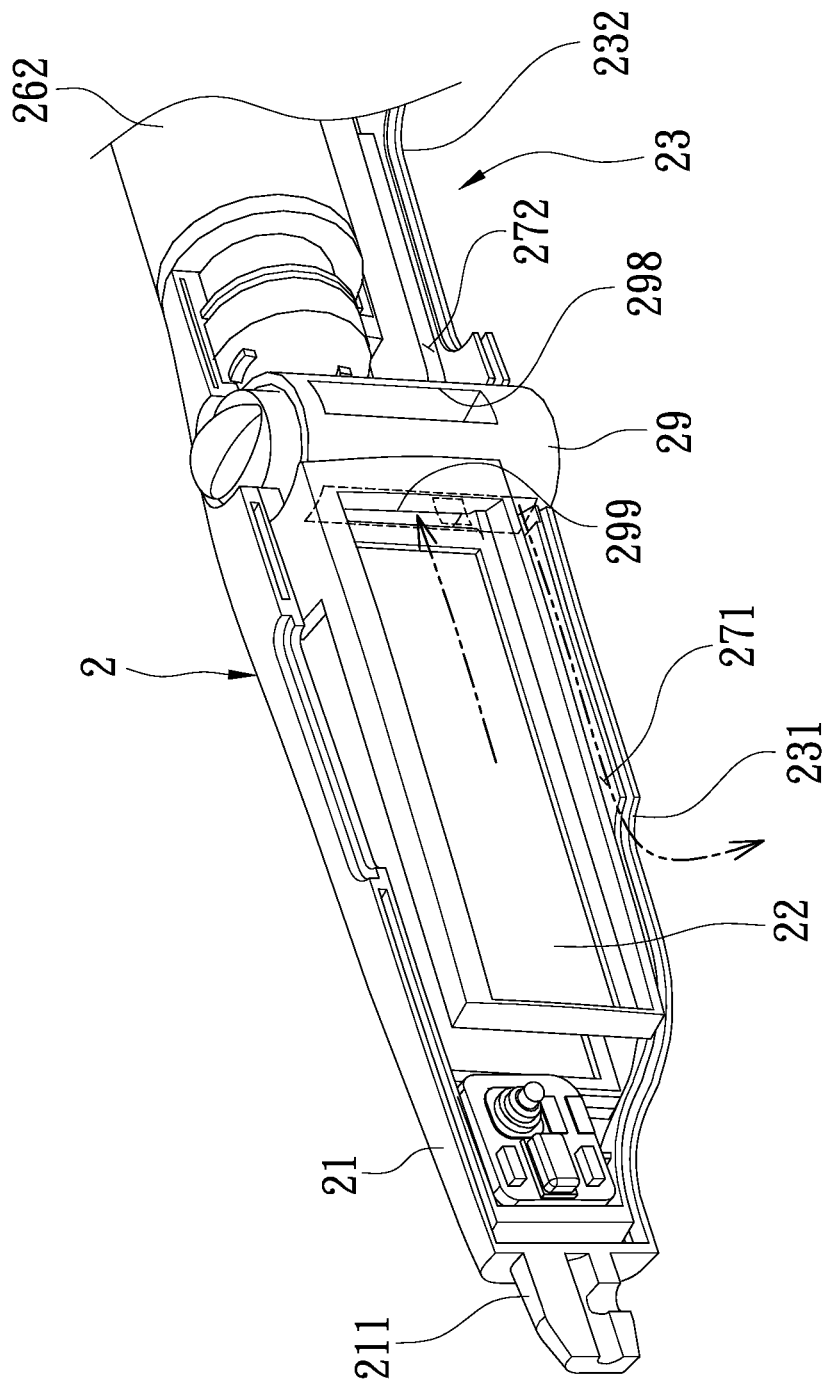
FIG. 13 is a partial enlarged view showing a sound transmission path of a Bluetooth earphone of a fourth embodiment according to the present invention.
Figure 14:
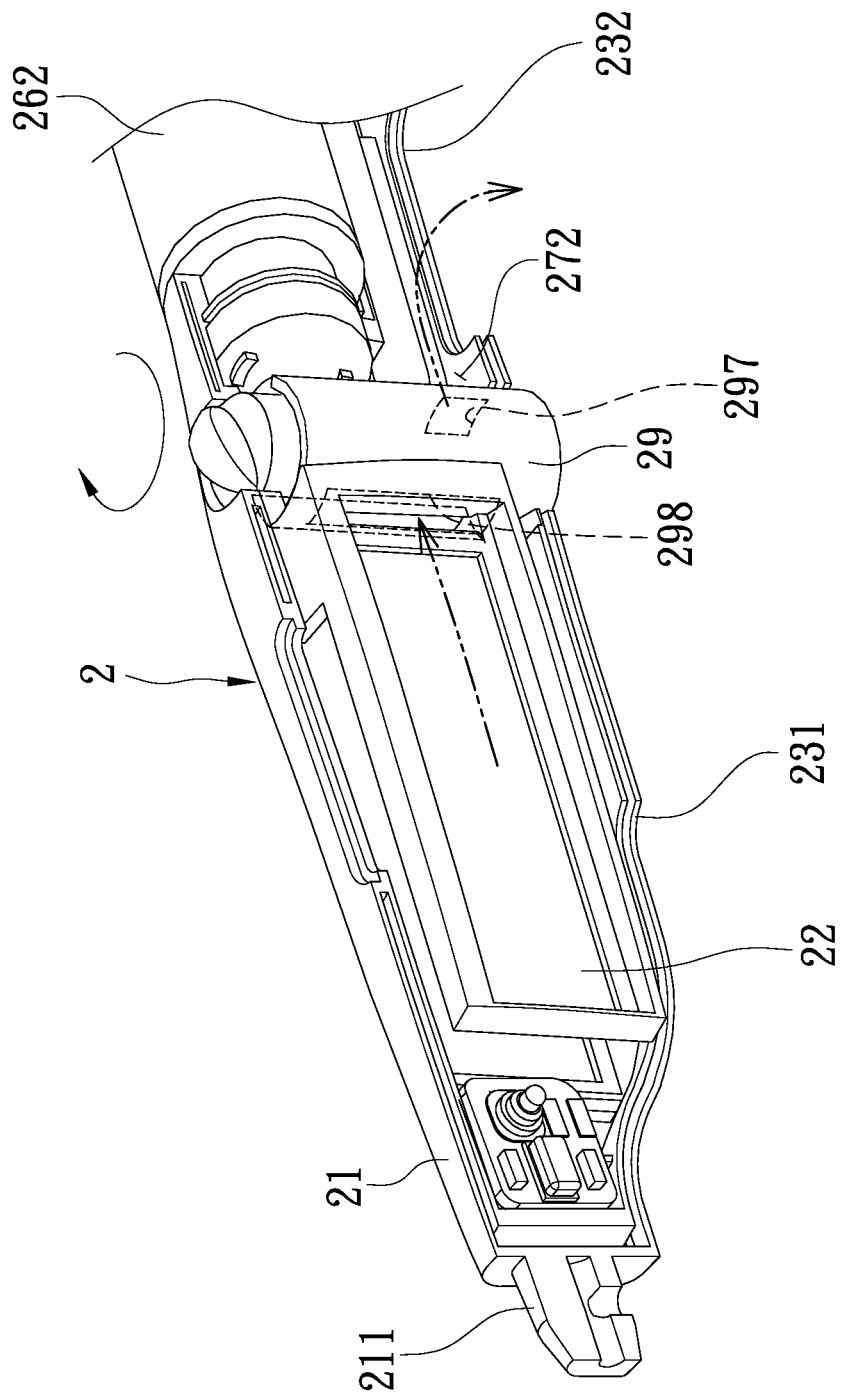
FIG. 14 is another partial enlarged view showing another sound transmission path of a Bluetooth earphone of a fourth embodiment according to the present invention.

Refer to FIG. 12, a fourth embodiment is revealed. The speaker cavity 221 and the circuit-module cavity 251 of the Bluetooth earphone 2 of the above embodiment are interchanged to form this embodiment. Thus the speaker cavity 221 is located at the front part of the earphone body 21 while the circuit-module cavity 251 is located at the rear part of the earphone body 21. A first audio guide channel 271 is mounted in the earphone body 21 for communicating the knob cavity 28 with the front broadcast hole 231 at the bottom side of the front part of the earphone body 21. A rear broadcast hole 232 is arranged at the bottom side of the rear part of the earphone body 21 and a second audio guide channel 272 is mounted in the earphone body 21 for communicating the knob cavity 28 with the rear broadcast hole 232. The positions of the first sound channel 297, the second sound channel 298, and the third sound channel 299 of the adjustment knob 29 are able to be moved and switched for alignment with the positions of the speaker 22, the first audio guide channel 271, and the second audio guide channel 272 correspondingly and selectively. As to the knob cavity 28, it can be disposed horizontally as shown in FIG. 7 or vertically as shown in FIG. 12 with the same positioning and limit components provided. Moreover, a diameter (size) of the first sound channel 297, the second sound channel 298, and the third sound channel 299 can also be adjusted according to users' needs. Also refer to FIG. 13, when the adjustment knob 29 is rotated an angle required for playing sounds toward the front side, an upper part of the third sound channel 299 of the adjustment knob 29 is aligned with the speaker 22 and a lower part of the third sound channel 299 of the adjustment knob 29 is aligned with the first audio guide channel 271 while the first sound channel 297 and the second sound channel 298 are blocked by the wall of the knob cavity 28. Thus sounds played by the speaker 22 are sent through the upper part and the lower part of the third sound channel 299 in turn and then the first audio guide channel 271 to be output through the front broadcast hole 231. With reference to FIG. 14, while the adjustment knob 29 being rotated to an angle for broadcast toward the rear side, the third sound channel 299 of the adjustment knob 29 is blocked by the wall of the knob cavity 28 while the second sound channel 298 is aligned with the speaker 22 and the first sound channel 297 is aligned with the second audio guide channel 272. Thereby sounds coming from the speaker 22 are transmitted through the second sound channel 298, the first sound channel 297, and the second audio guide channel 272 to be output through the rear broadcast hole 232.

Figure 15:
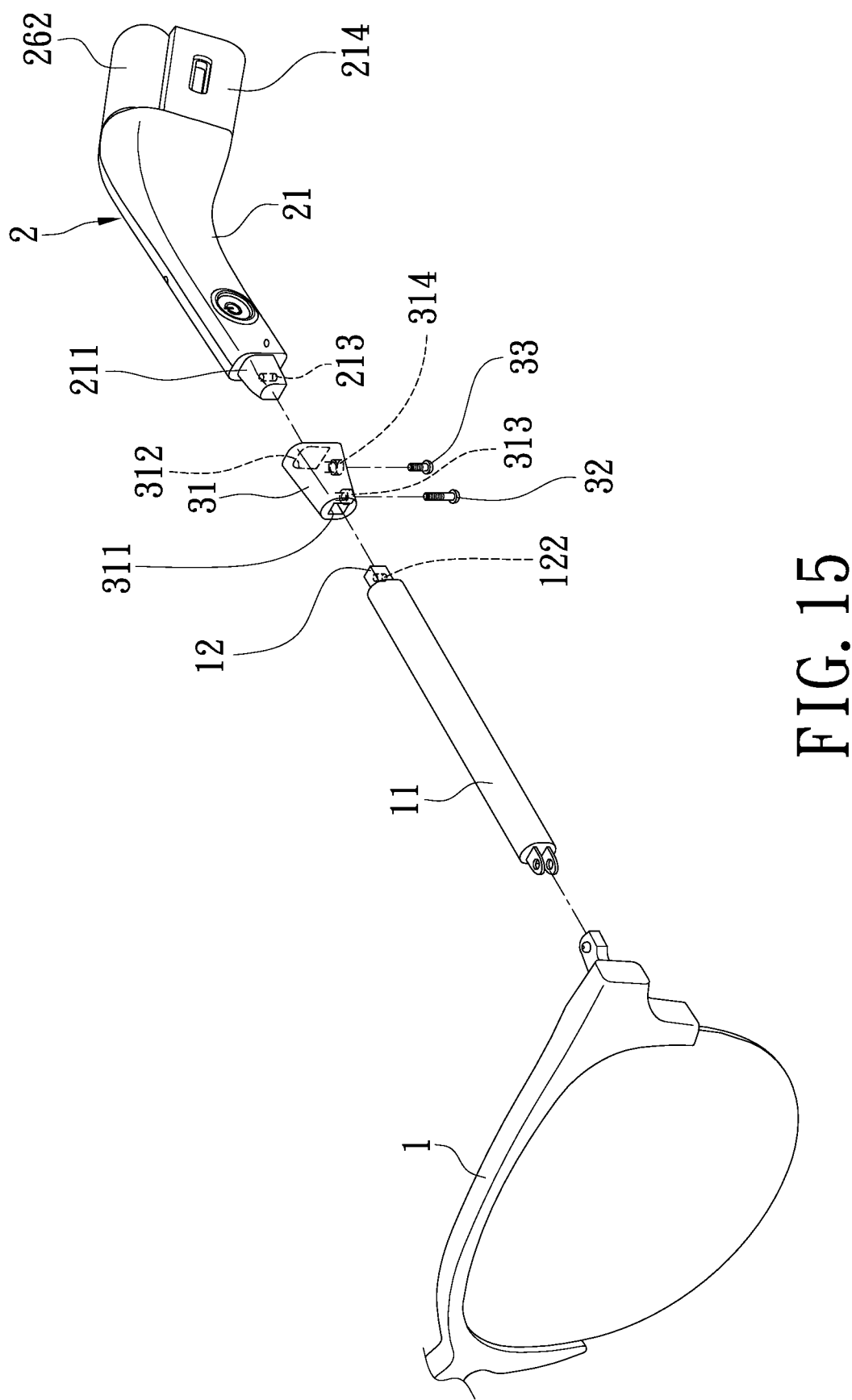
FIG. 15 is an exploded view of a fifth embodiment according to the present invention.

Refer to FIG. 15, a further embodiment (fifth embodiment) is disclosed. The second assembly portion 211 of the earphone body 21 of the Bluetooth earphone 2 and the first assembly portion 12 of the temple 11 of the glasses body 1 are both rectangular blocks while the sleeve 31 of the connection member 3 is a truncated cone and tapered from the rear end to the front end of the sleeve 31. Both the first mounting hole 311 and the second mounting hole 312 are rectangular. Thus the rectangular first assembly portion 12 of the temple 11 is mounted and connected to the rectangular first mounting hole 311 of the sleeve 31. Then the first fastener 32 is inserted through the first insertion hole 313 of the sleeve 31 to be connected and fixed with the first lock hole 122 of the first assembly portion 12. Similarly, the second assembly portion 211 which is a rectangular block of the earphone body 21 is mounted and connected to the rectangular second mounting hole 312 of the sleeve 31 and the second fastener 33 is inserted through the second insertion hole 314 of the sleeve 31 to be connected and fixed with the second lock hole 213 of the second assembly portion 211.

Figure 16:
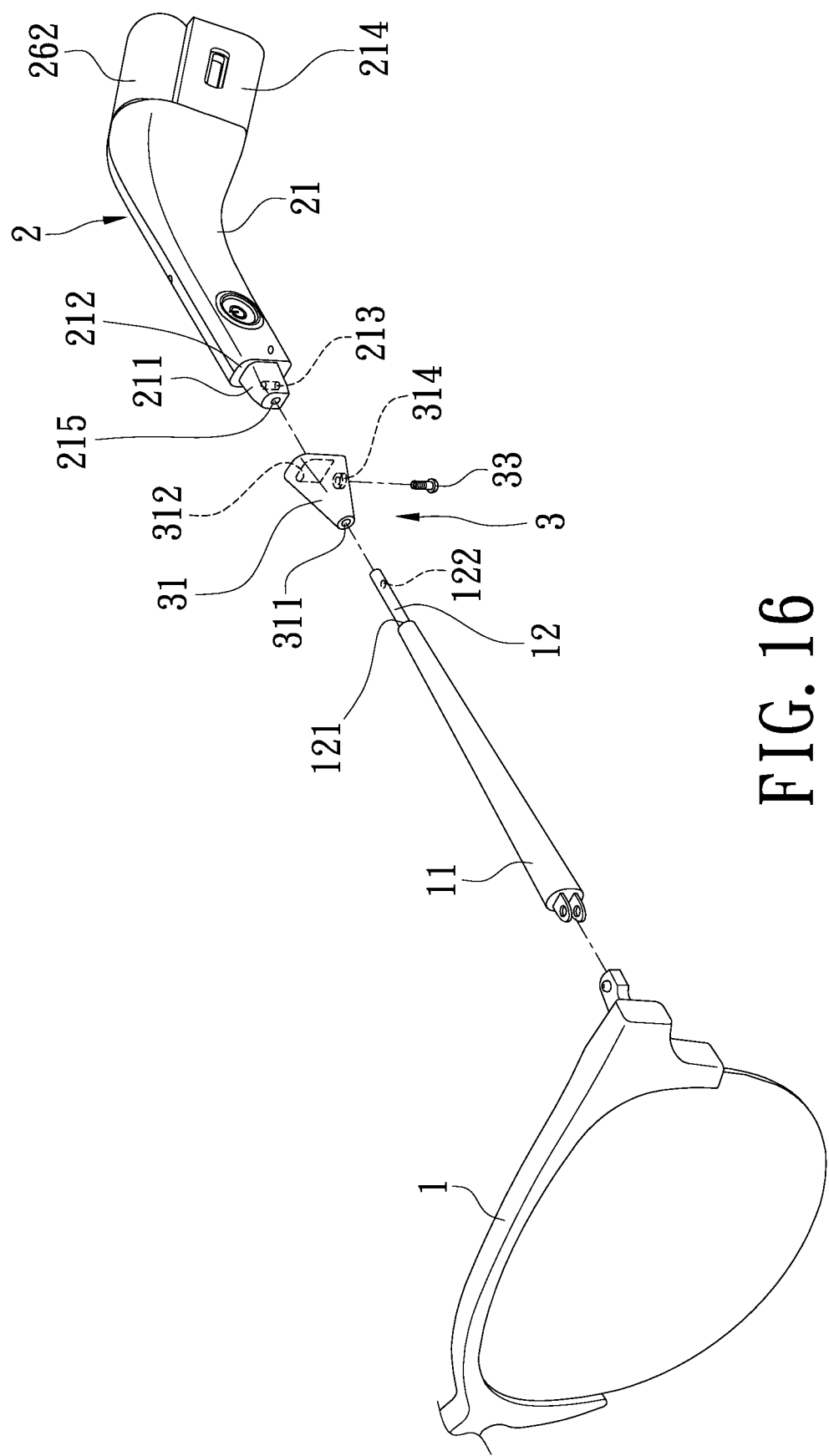
FIG. 16 is an exploded view of a sixth embodiment according to the present invention.
Figure 17:
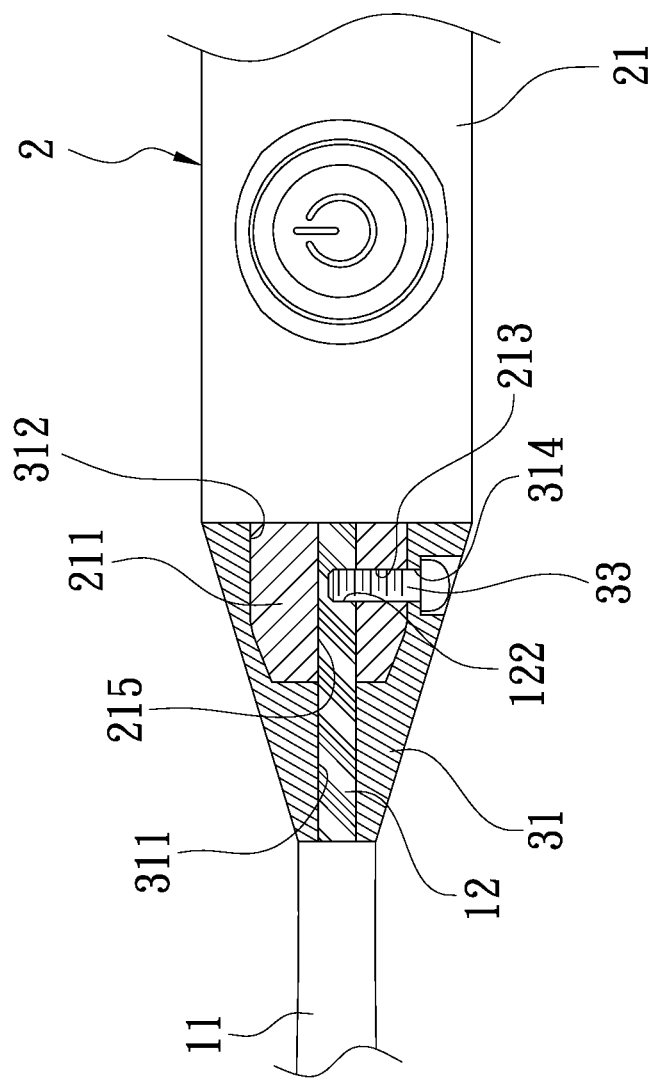
FIG. 17 is a partial enlarged sectional view of a sixth embodiment according to the present invention.

Refer to FIG. 16, a further embodiment (sixth embodiment) of the present invention is disclosed. The first assembly portion 12 of the temple 11 is an elliptic cylinder and the second assembly portion 211 of the earphone body 21 is a rectangular block while the sleeve 31 of the connection member 3 is conical and tapered from the rear end to the front end of the sleeve 31. The first mounting hole 311 and the second mounting hole 312 of the sleeve 31 are communicating with each other. The first mounting hole 311 of the sleeve 31 is elliptic for being aligned and connected with the elliptic first assembly portion 12 of the temple 11. The second mounting hole 312 of the sleeve 31 is rectangular for being aligned and connected with the rectangular second assembly portion 211 of the earphone body 21. The second assembly portion 211 is provided with a connection hole 215 which is an elliptic hole extending backward from the front end of the second assembly portion 211 and communicating with the second lock hole 213 on the bottom side of the second assembly portion 211. Also refer to FIG. 17, the first assembly portion 12 of the temple 11 is inserted into the connection hole 215 while the first lock hole 122 of the first assembly portion 12 is aligned with the second lock hole 213 of the second assembly portion 211 and thus the second fastener 33 is inserted through the second insertion hole 314 of the sleeve 31 and threaded through the second lock hole 213 of the second assembly portion 211 to be connected and fixed with the first lock hole 122 of the first assembly portion 12.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:
1. A type of wireless communication eyeglasses comprising:
an eyeglasses body including a temple pivotally connected to a lateral side of the eyeglasses body and a rear end of the temple being connected to a first assembly portion;
an earphone having an earphone body which is provided with a second assembly portion connected to a front end of the earphone body and an ear-hanging part curved downward and disposed on a rear part of the earphone body; and a connection member provided with a sleeve which includes a first mounting hole extending backward from a front end of the sleeve and a second mounting hole extending forward from a rear end of the sleeve; the first assembly portion of the temple is aligned and connected with the first mounting hole of the sleeve and the second assembly portion of the earphone body is aligned and connected with the second mounting hole of the sleeve.

2. The wireless communication eyeglasses as claimed in claim 1, wherein a speaker cavity is formed in a front part of the earphone body and a speaker is mounted in the speaker cavity while a front broadcast hole is formed on a bottom side of the front part of the earphone body and communicating with the speaker cavity; wherein a circuit-module cavity is arranged at a rear part of the earphone body and a circuit module is mounted in the circuit-module cavity; wherein a power connector is disposed on the rear part of the earphone body and both the speaker and the power connector are electrically connected to the circuit module; wherein the earphone is further provided with a rechargeable battery which is assembled with the power connector.

3. The wireless communication eyeglasses as claimed in claim 1, wherein a speaker cavity is formed in a rear part of the earphone body of the earphone and a speaker is mounted in the speaker cavity while a front broadcast hole is formed on a bottom side of a front part of the earphone body; wherein an audio guide channel is mounted in the earphone body and the speaker cavity and the front broadcast hole are communicating with each other by the audio guide channel; wherein a circuit-module cavity is disposed in the front part of the earphone body and a circuit module is mounted in the circuit-module cavity; wherein a power connector is arranged at the rear part of the earphone body and both the speaker and the power connector are electrically connected to the circuit module; wherein the earphone is further provided with a rechargeable battery which is assembled with the power connector.

4. The wireless communication eyeglasses as claimed in claim 1, wherein a speaker cavity is formed in a rear part of the earphone body of the earphone and a speaker is mounted in the speaker cavity while a circuit-module cavity is disposed in a front part of the earphone body and a circuit module is mounted in the circuit-module cavity; wherein the earphone body is provided with a knob cavity located between the speaker cavity and the circuit-module cavity; wherein a front broadcast hole is formed on a bottom side of the front part of the earphone body while an audio guide channel is mounted in the earphone body for communicating the knob cavity with the front broadcast hole; wherein a rear broadcast hole is mounted to a bottom side of the earphone body and corresponding to the knob cavity for communicating with the knob cavity; wherein an adjustment knob is mounted in the knob cavity and provided with a first sound channel, a second sound channel, and a third sound channel which are disposed around the adjustment knob with an interval between the two adjacent sound channels and communicating with one another; wherein positions of the first sound channel, the second sound channel, and the third sound channel of the adjustment knob are moved and switched to selectively make the third sound channel and the first sound channel align with the speaker and the rear broadcast hole respectively, or the first sound channel and the second sound channel align with the speaker and the audio guide channel respectively; wherein a power connector is arranged at the rear part of the earphone body and both the speaker and the power connector are electrically connected to the circuit module; wherein the earphone is further provided with a rechargeable battery which is assembled with the power connector.

5. The wireless communication eyeglasses as claimed in claim 4, wherein an axial hole is mounted to a middle part of a bottom of the knob cavity while a rotating pin is arranged at a middle part of an inner surface of the adjustment knob and assembled with the axial hole of the knob cavity; wherein a first positioning hole and a second positioning hole with a certain interval therebetween are disposed on the bottom of the knob cavity and located around the axial hole; wherein a receiving hole is arranged at the inner surface of the adjustment knob and beside the rotating pin; an elastic member and a positioning member are mounted into the receiving hole in turn and the positioning member is able to be locked with and positioned by the first positioning hole or the second positioning hole of the knob cavity selectively; wherein a limit projection is disposed on a wall of the knob cavity while a limit slot is mounted to a wall of the adjustment knob and having a first side and a second side opposite to each other; the limit projection of the knob cavity is mounted in the limit slot of the adjustment knob to be abutting against and limited by the first side or second side of the limit slot selectively; wherein a knob part is formed on an outer surface of the adjustment knob.

6. The wireless communication eyeglasses as claimed in claim 1, wherein a speaker cavity is arranged at a front part of the earphone body of the earphone and a speaker is mounted in the speaker cavity while a circuit-module cavity is disposed in a rear part of the earphone body and a circuit module is mounted in the circuit-module cavity; wherein the earphone body is provided with a knob cavity located between the speaker cavity and the circuit-module cavity; wherein a front broadcast hole is formed on a bottom side of the front part of the earphone body and a first audio guide channel is mounted in the earphone body for communicating the knob cavity with the front broadcast hole; wherein a rear broadcast hole is arranged at a bottom side of the rear part of the earphone body and a second audio guide channel is mounted in the earphone body for communicating the knob cavity with the rear broadcast hole; wherein an adjustment knob is mounted in the knob cavity and provided with a first sound channel, a second sound channel, and a third sound channel which are disposed around the adjustment knob with an interval between the first and third sound channels and between the third and second sound channels, and first, second and third sound channels communicating with one another; wherein positions of the first sound channel, the second sound channel, and the third sound channel of the adjustment knob are moved and switched to selectively make an upper part and a lower part of the third sound channel align with the speaker and the first audio guide channel respectively, or the second sound channel and the first sound channel align with the speaker and the second audio guide channel respectively; wherein a power connector is arranged at the rear part of the earphone body and both the speaker and the power connector are electrically connected to the circuit module; wherein the earphone is further provided with a rechargeable battery which is assembled with the power connector.

7. The wireless communication eyeglasses as claimed in claim 6, wherein an axial hole is mounted to a middle part of a bottom of the knob cavity while a rotating pin is arranged at a middle part of an inner surface of the adjustment knob and assembled with the axial hole of the knob cavity; wherein a first positioning hole and a second positioning hole with a certain interval therebetween are disposed on the bottom of the knob cavity and located around the axial hole; wherein a receiving hole is arranged at the inner surface of the adjustment knob and beside the rotating pin; an elastic member and a positioning member are mounted into the receiving hole in turn and the positioning member is able to be locked with and positioned by the first positioning hole or the second positioning hole of the knob cavity selectively; wherein a limit projection is disposed on a wall of the knob cavity while a limit slot is mounted to a wall of the adjustment knob and having a first side and a second side opposite to each other; the limit projection of the knob cavity is mounted in the limit slot of the adjustment knob to be abutting against and limited by the first side or second side of the limit slot selectively; wherein a knob part is formed on an outer surface of the adjustment knob.

8. The wireless communication eyeglasses as claimed in claim 1, wherein the sleeve of the connection member is a rectangular prism; a first insertion hole and a second insertion hole are arranged at one side of the sleeve and communicating with the first mounting hole and the second mounting hole respectively; wherein one side of the first assembly portion on the temple of the glasses body is provided with a first lock hole and one side of the second assembly portion of the earphone body of the earphone is provided with a second lock hole; the first lock hole of the first assembly portion is aligned with the first insertion hole of the sleeve and the second lock hole of the second assembly portion is aligned with the second insertion hole of the sleeve; the sleeve is further provided with a first fastener and a second fastener which are respectively inserted through the first insertion hole and the second insertion hole of the sleeve and fastened with the first lock hole of the first assembly portion and the second lock hole of the second assembly portion.

9. The wireless communication eyeglasses as claimed in claim 1, wherein the sleeve of the connection member is a truncated cone and tapered from the rear end to the front end of the sleeve; a first insertion hole and a second insertion hole are arranged at one side of the sleeve and communicating with the first mounting hole and the second mounting hole respectively; wherein one side of the first assembly portion on the temple of the glasses body is provided with a first lock hole and one side of the second assembly portion of the earphone body of the earphone is provided with a second lock hole; the first lock hole of the first assembly portion is aligned with the first insertion hole of the sleeve and the second lock hole of the second assembly portion is aligned with the second insertion hole of the sleeve; the sleeve is further provided with a first fastener and a second fastener which are respectively inserted through the first insertion hole and the second insertion hole of the sleeve and fastened with the first lock hole of the first assembly portion and the second lock hole of the second assembly portion.

10. The wireless communication eyeglasses as claimed in claim 1, wherein the sleeve of the connection member is conical and tapered from the rear end to the front end of the sleeve; wherein the first mounting hole and the second mounting hole of the sleeve are communicating with each other; wherein a second insertion hole is formed on one side of the sleeve and communicating with the second mounting hole; wherein one side of the first assembly portion on the temple of the glasses body is provided with a first lock hole and one side of the second assembly portion of the earphone body of the earphone is provided with a second lock hole; wherein the second assembly portion is provided with a connection hole extending backward from the front end of the second assembly portion and communicating with the second lock hole of the second assembly portion while the first assembly portion is inserted into the connection hole of the second assembly portion and the first lock hole of the first assembly portion is aligned with the second lock hole of the second assembly portion; the sleeve is further provided with a second fastener which is inserted through the second insertion hole of the sleeve and threaded through the second lock hole of the second assembly portion to be connected and fixed with the first lock hole of the first assembly portion.

\* \* \* \* \*